US009965453B2

(12) United States Patent
Davis et al.

(10) Patent No.: US 9,965,453 B2
(45) Date of Patent: May 8, 2018

(54) DOCUMENT TRANSFORMATION

(75) Inventors: Joseph M. Davis, Issaquah, WA (US); Vishal R. Joshi, Redmond, WA (US); Alison Q. Lu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1046 days.

(21) Appl. No.: 12/579,417

(22) Filed: Oct. 15, 2009

(65) Prior Publication Data
US 2011/0093774 A1    Apr. 21, 2011

(51) Int. Cl.
*G06F 17/00* (2006.01)
*G06F 17/22* (2006.01)

(52) U.S. Cl.
CPC .................. *G06F 17/227* (2013.01)

(58) Field of Classification Search
CPC ...................................... G06F 17/227
USPC ....................................... 715/236
See application file for complete search history.

(56) References Cited

U.S. PATENT DOCUMENTS

| 6,845,380 | B2* | 1/2005 | Su et al. | |
| 6,941,511 | B1* | 9/2005 | Hind et al. | 715/235 |
| 6,961,760 | B2* | 11/2005 | Li et al. | 709/219 |
| 7,069,504 | B2* | 6/2006 | Mani et al. | 715/239 |
| 7,237,191 | B1 | 6/2007 | Sulistio et al. | |
| 7,480,860 | B2* | 1/2009 | White | 715/255 |
| 7,581,177 | B1* | 8/2009 | Mollicone et al. | 715/243 |
| 2002/0143816 | A1 | 10/2002 | Geiger et al. | |
| 2003/0097637 | A1* | 5/2003 | Tozawa et al. | 715/513 |
| 2003/0120686 | A1* | 6/2003 | Kim et al. | 707/200 |
| 2003/0167277 | A1* | 9/2003 | Hejlsberg et al. | 707/102 |
| 2003/0167445 | A1* | 9/2003 | Su et al. | 715/513 |
| 2004/0060004 | A1* | 3/2004 | Mani et al. | 715/513 |
| 2005/0125720 | A1* | 6/2005 | Little | G06F 17/2205 715/239 |
| 2005/0132282 | A1* | 6/2005 | Panditharadhya et al. | 715/516 |
| 2005/0240876 | A1* | 10/2005 | Myers et al. | 715/763 |
| 2006/0026505 | A1* | 2/2006 | Mani et al. | 715/513 |
| 2007/0157083 | A1* | 7/2007 | Roy et al. | 715/522 |
| 2007/0220022 | A1 | 9/2007 | Lankinen et al. | |
| 2007/0239762 | A1* | 10/2007 | Farahbod | 707/102 |
| 2007/0240040 | A1* | 10/2007 | Peters et al. | 715/522 |
| 2007/0271305 | A1* | 11/2007 | Chandrasekar et al. | 707/200 |

(Continued)

OTHER PUBLICATIONS

"XSLT <xsl:apply-imports> Element", pp. 1-2, dated Oct. 14, 2008, URL:<http://w w w .w 3schools.com/XSL/el_apply-imports.asp>.*

(Continued)

*Primary Examiner* — Mustafa A Amin
(74) *Attorney, Agent, or Firm* — Fiala & Weaver P.L.L.C.

(57) ABSTRACT

Aspects of the subject matter described herein relate to transforming documents. In aspects, a transformer obtains a source document and a transformation document. The transformation document indicates changes to make to the source document to transform the source document. The transformation document also includes location information that indicates where the changes are to be made. The transforms indicated by the transformation document may be extensible. Using the source document and the transformation document, the transformer transforms the source document into a target document. The transformer may be part of a development environment used to develop applications.

20 Claims, 6 Drawing Sheets

(56) References Cited

U.S. PATENT DOCUMENTS

| | | | |
|---|---|---|---|
| 2008/0040513 A1* | 2/2008 | Asakawa et al. | 710/1 |
| 2008/0275907 A1* | 11/2008 | Han et al. | 707/102 |
| 2009/0019072 A1* | 1/2009 | Chen et al. | 707/101 |
| 2009/0077199 A1* | 3/2009 | Emori | 709/218 |
| 2009/0106775 A1 | 4/2009 | Cermak et al. | |
| 2009/0132912 A1* | 5/2009 | Sulistio et al. | 715/236 |
| 2009/0187530 A1* | 7/2009 | Nair et al. | 707/1 |
| 2009/0193440 A1* | 7/2009 | Arthursson et al. | 719/323 |
| 2009/0210864 A1* | 8/2009 | Oberhauser et al. | 717/140 |
| 2010/0275117 A1* | 10/2010 | Vion-Dury et al. | 715/234 |
| 2010/0332966 A1* | 12/2010 | Idicula et al. | 715/234 |
| 2011/0161801 A1* | 6/2011 | Harrop et al. | 715/234 |
| 2011/0202902 A1* | 8/2011 | Whelan | 717/126 |

OTHER PUBLICATIONS

"ASP.NET 4.0 新特性—Web.Config Transformation", pp. 1-9, dated Sep. 2, 2009, URL<http://www .cnblogs.com/worksguo/archive/2009/08/29/1556307.html>.*

Peipman, "Visual Studio 2010: Web.config transforms", dated Jun. 16, 2009, pp. 1-3, URL:<http://gunnarpeipman.com/2009/06/visual-studio-2010-web-config-transforms/ 1/>.*

Guo, "ASP.NET 4.0 new features—Web.Config Transformation (Original)", machine english translation of "ASP.NET 4.0 新特性 —Web.Config Transformation (原创 )", total pp. 15, dated Sep. 2, 2010, url <https://web.archive.org/web/20090902011729/http://www.cnblogs.com/worksguo/archive/2009/08/29/1556307.html>.*

"Style Sheets in HTML documents", pp. 1-8, dated Feb. 2, 2008, url <https://web.archive.org/web/20080202075658/http://www.w3.org/TR/html401/present/styles.html#adef-style>.*

Tomoya Suzuki, "XML Tutorial vol. 7: XSLT Basics", NPL, pp. 1-11, dated: Feb. 26, 2009, URL:<http://web.archive.org/web/20090226222825/http://www.xmlmaster.org/en/article/d01/c07/>.*

Extensible Markup Language (XML) 1.0 (second Edition), dated Oct. 6, 2000, pp. 1-59, URL<https://www.w3.org/TR/2000/REC-xml-20001006#sec-prolog-dtd>.*

Minevskiy, Ivan , "Doxpects: XML Transformation Aspects", retrieved at <<http://www.cs.ubc.ca/grads/resources/thesis/Nov06/Minevskiy_Ivan.pdf>>, Aug. 2004, pp. 71.

Villard, et al., "iXSLT: An Incremental XSLT Transformation Processor for XML Document Manipulation", retrieved at <<http://citeseerx.ist.psu.edu/viewdoc/download?doi=10.1.1.21.5372&rep=rep1&type=pdf>>, Sep. 14, 2009, pp. 25.

Boukottaya, et al., "Automating XML Documents Transformations: A Conceptual Modelling Based Approach", retrieved at <<http://citeseerx.ist.psu.edu/viewdoc/download?doi=10.1.1.90.4548&rep=rep1&type=pdf>>, Sep. 14, 2009, pp. 10.

"XSL Transformations" retrieved at <<http://en.wikipedia.org/wiki/Xslt>>, Sep. 25, 2009, pp. 9.

"XPath", retrieved at <<http://en.wikipedia.org/wiki/Xpath>> Oct. 8, 2009, pp. 2.

"XSL Transformations (XSLT) Version 2.0" retrieved at <<http://www.w3.org/TR/xslt20/>>, Jan. 23, 2007, pp. 360.

"Web Deployment: Web.Config Transformation", retrieved at <<http://vishaljoshi.blogspot.com/2009/03/web-deployment-webconfig-transformation_23.html>>, Sep. 25, 2009, pp. 10.

Joshi, Vishal R., "Microsoft Visual Studio 10: Easing ASP.NET Web Deployment", Oct. 27, 2008, pp. 25.

* cited by examiner

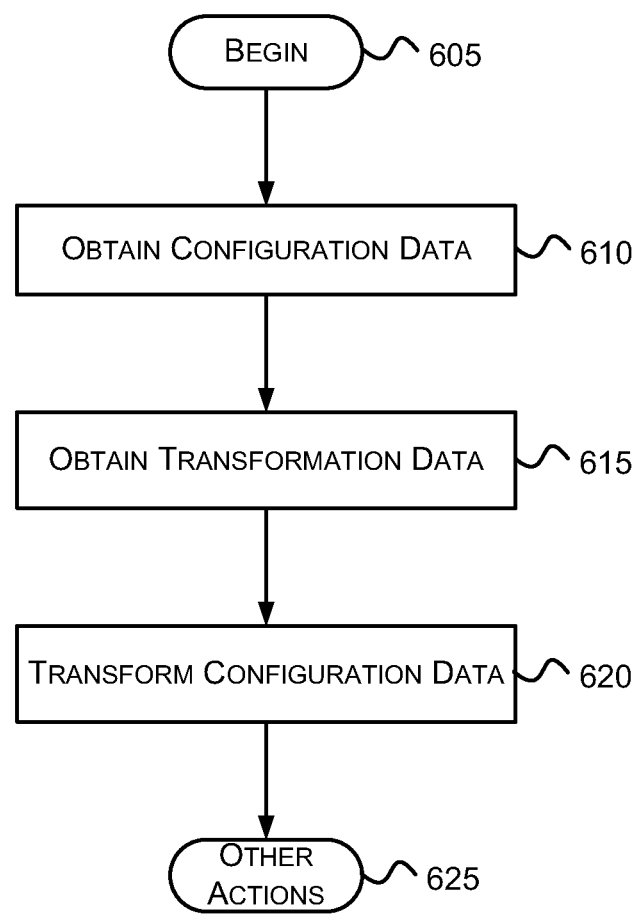

DOCUMENT TRANSFORMATION

BACKGROUND

XSL Transformations (XSLT) is a language that allows a skilled developer to specify operations to create Extensible Markup Language (XML) documents from other XML documents. XSLT itself is expressed in XML and has a complex syntax. The specification for XSLT version 2.0 available from W3C is over 350 pages of mostly single-spaced text, and many books have been published about XSLT. While powerful, the features of XSLT can be difficult to learn and use for those who seek to work with XML documents.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to transforming documents. In aspects, a transformer obtains a source document and a transformation document. The transformation document indicates changes to make to the source document to transform the source document. The transformation document also includes location information that indicates where the changes are to be made. The transforms indicated by the transformation document may be extensible. Using the source document and the transformation document, the transformer transforms the source document into a target document. The transformer may be part of a development environment used to develop applications.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIG. 6 is a flow diagram that represents exemplary actions that may occur to transform configuration data of an application to make the configuration data suitable for use by the application in another environment in accordance with aspects of the subject matter described herein.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
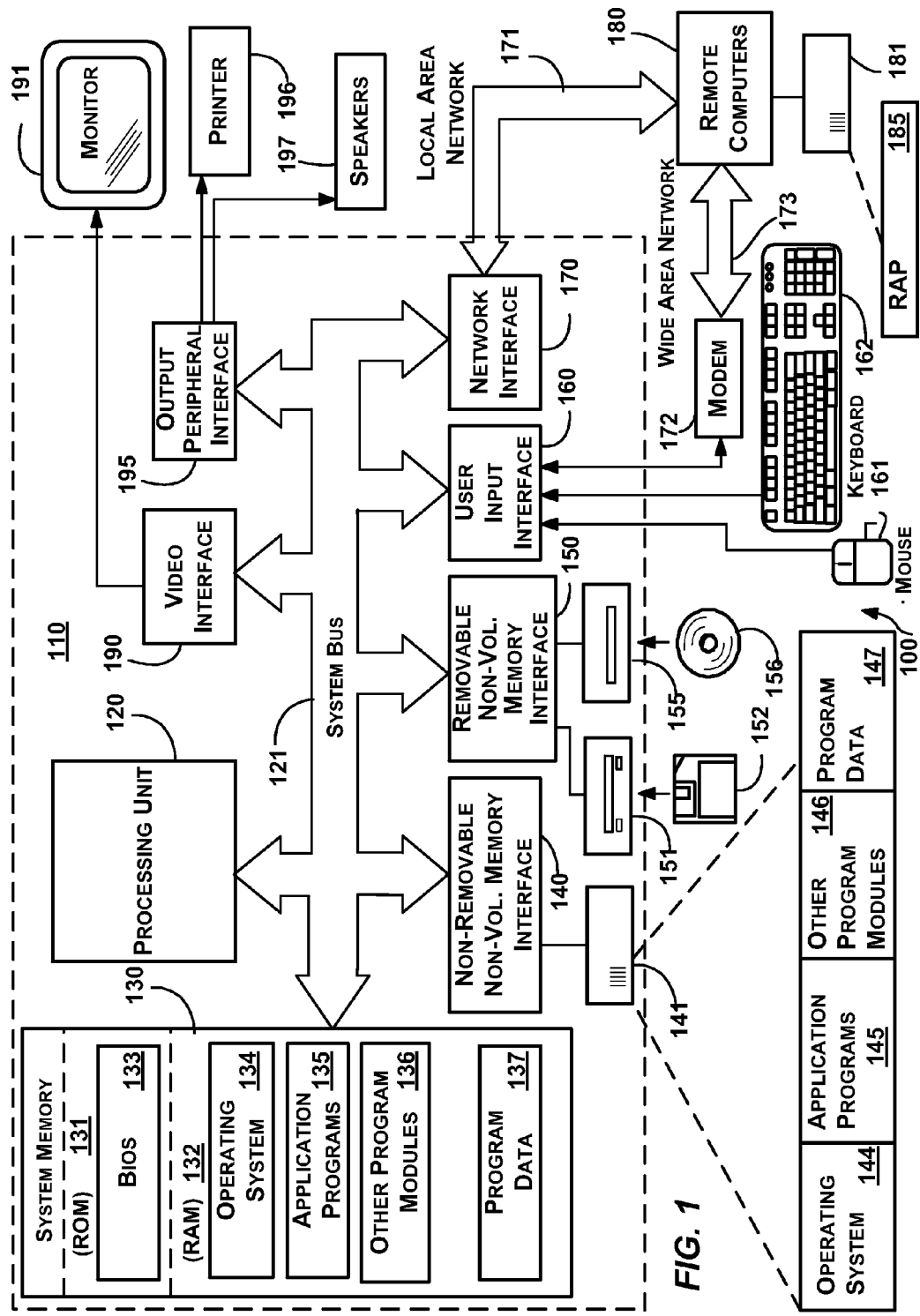
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Document Transformation

Figure 2:
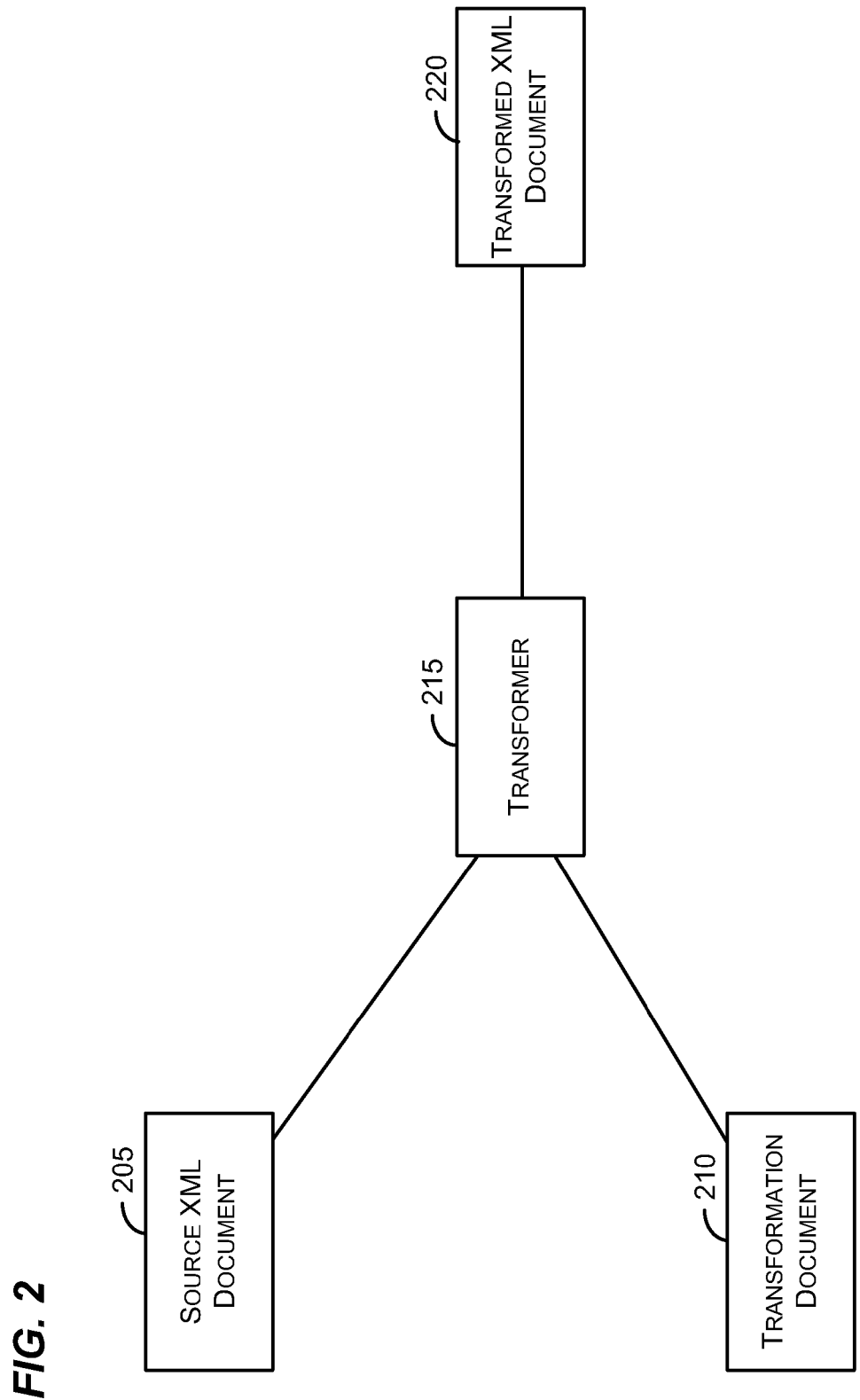
FIG. 2 is a block diagram representing an exemplary environment in which aspects of the subject matter described herein may be implemented.

As mentioned previously, XSLT may be difficult to learn and use for those who seek to work with XML documents. FIG. 2 is a block diagram representing an exemplary environment in which aspects of the subject matter described herein may be implemented. In the environment, a transformer 215 may obtain a source XML document 205 and a transformation document 210 and may produce a transformed XML document 220.

The transformer 215 may comprise a component of a computing environment. As used herein, the term component is to be read to include all or a portion of a device, a collection of one or more software modules or portions thereof, some combination of one or more software modules or portions thereof and one or more devices or portions thereof, and the like. In one exemplary embodiment, the transformer 215 may comprise an integrated development environment (IDE) that allows a software developer to enter and update code, debug code, create and update databases, associate the code with one or more databases or other components, compile the code, create a package, do other actions, and the like.

The transformer 215 may invoke one or more processes to perform various actions. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

The source XML document 205 may comprise any XML document. An XML document includes a string of characters encoded according to past, present, or future XML specifications. Although a source and transformed XML documents are often referred to herein, the teachings herein may also be applied to other documents formatted in with syntax other than XML without departing from the spirit or scope of aspects of the subject matter described herein.

The transformation document 210 may include one or more documents that indicate changes to make to the source XML document 205 to create the transformed XML document 220. The transformation document 210 may include declarative statements that indicate modifications to a copy of the source XML document 205 copy to transform the copy into the transformed XML document 220. Declarative statements express changes without describing an algorithm by which the changes are to be performed. The transformation document 210 may also be encoded in XML.

When the transformation document 210 includes more than one document, the changes indicated by the documents may be applied in a specified order to produce the transformed XML document 220. In one embodiment, the documents may be "chained" together such that the changes in one document are applied, followed by the changes in another document, followed by the changes in another document, and so forth until changes in all documents have been applied.

The schema in the transformation document 210 and the source XML document 205 may (but need not) be identical. A schema expresses constraints on structure and content of a document that are additional to constraints imposed by XML. Furthermore, the transformed XML document 220 may be represented in the same language (e.g., XML) as the source XML document 205 or in a different language than the source XML document 205.

One example of a source XML document is as follows:

```
<?xml version="1.0"?>
<configuration>
    <appSettings>
        <add key="logLocation" value="V:\Logs" />
    </appSettings>
    <connectionStrings>
        <add name="contosoDB" connectionString="Data Source=.\SQLEXPRESS;AttachDbFilename=|DataDirectory|\contosoDB.MDF;Integrated Security=True;User Instance=True"
            providerName="System.Data.SqlClient" />
    </connectionStrings>
    <system.web>
        <compilation debug="true">
        </compilation>
        <authentication mode="Windows" />
        <authorization>
            <allow roles="Admins" />
            <allow roles="Developers" />
        </authorization>
        <customErrors mode="On"
            defaultRedirect="GenericErrorPage.htm">
            <error statusCode="403" redirect="NoAccess.htm" />
            <error statusCode="404" redirect="FileNotFound.htm"
                />
        </customErrors>
    </system.web>
</configuration>
```

It may be desired to transform the exemplary source XML document to the following exemplary transformed document (where the changed portions are indicated in bolded text):

```
<?xml version="1.0"?>
<configuration>
    <appSettings>
        <add key="logLocation" value="E:\contoso\User\Log" />
    </appSettings>
    <connectionStrings>
        <add name="contosoDB" connectionString="Data Source=ProdServer;database=contosoDB;Integrated Security=True;"
            providerName="System.Data.SqlClient" />
    </connectionStrings>
    <system.web>
        <compilation debug="false">
        </compilation>
        <authentication mode="Windows" />
        <authorization>
            <allow roles="Admins" />
            <deny users="Vishal" />
            <allow roles="Developers" />
        </authorization>
        <customErrors mode="Off"
            defaultRedirect="GenericErrorPage.htm">
            <error statusCode="403" redirect="NoAccess.htm" />
            <error statusCode="404" redirect="FileNotFound.htm"
                />
        </customErrors>
    </system.web>
</configuration>
```

Each section of an XML document that starts with a "<ArbitraryText" and ends with a "/ArbitraryText>" (where the ArbitraryText is any sequence of characters) is referred to herein as a node. A section of an XML document that starts with a "<ArbitraryText" and ends with "/>" is also referred to herein as a node. A node may be said to include a set of related data.

A node may include other nodes, which may include other nodes, which may include other nodes, and so forth up to any number of nested nodes. For example, in the XML documents above, the <configuration> node includes the <appSettings>, <connectionStrings>, and <system.web> nodes. The <appSettings> node includes an <add> node. The <system.web> node includes several nodes including an <authorization> node that includes three other nodes.

To create a transformed XML document 220, the transformer 215 may perform actions including:

1. Iterating through the transformation document 210 to identify nodes in the source XML document 205 that need to be transformed. The transformation document 210 includes information that identifies nodes that need to be changed in the source XML document 205. This information may include the layout of the nodes and additional criteria for identifying nodes sometimes referred to as locators. The transformation document 210 also includes information that indicates what changes to make to the indicated nodes to create the transformed XML document 220. This information is sometimes referred to as transforms.

2. Obtaining nodes from the source XML document 205 that are referenced by transforms in the transformation document 210.

3. Applying the transforms defined by the transformation document 210 on nodes of the source XML document 205 and replacing/creating/updating the corresponding destination node with the transformed nodes.

In creating the transformed XML document 220, formatting, spacing, and ordering of nodes of the source XML document 205 may be preserved to the extent possible. Furthermore, transforms may be performed in the order they appear in the transformation document 210. For example, if transform X and transform Y both apply to the same node in the source XML document 205, the changes performed for transform Y may overwrite or otherwise modify the changes performed for transform X if transform Y appears somewhere after transform X in the transformation document 210. For example, if transform X replaces a value of a node with B, transform X may later replace the value or another value of the node (as modified by transform X) with C.

To preserve the source XML document 205 for subsequent use, the source XML document 205 itself may not be changed. Rather, a copy (in-memory or otherwise) of the source XML document 205 may be changed or the transformer 215 may build the transformed XML document 220 from the source XML document 205 and transforms indicated by the transformation document 210. Wherever a reference is made herein to changing the source XML document, the reference is to be read such that in one embodiment, the actual source XML document is changed and in another embodiment, the actual source XML document is not changed and the destination document is changed or updated in a manner consistent with the change.

Transforms may be indicated by keywords inside the transformation document 210. Transforms indicate changes to perform to create the transformed XML document 220. If the transformation document 210 is represented in XML, a transform may be indicated by a transform key in XML. The transform key may be included in an XML namespace sometimes referred to herein as xdt. Xdt stands for XML Document Transform. The xdt namespace includes predefined transform operations that are described below.

To reference an xdt namespace, the xdt namespace may be registered. For example, xdt may be registered via the following exemplary root node:

```
<configuration xmlns:xdt="http://schemas.microsoft.com/
    XML-Document-Transform">
```

Note that the above registration is exemplary and that the xdt namespace may be defined at a location other than http://schemas.microsoft.com/XML-Document-Transform.

Locators may also be represented as keywords inside the transformation document 210. Locators may provide additional criteria that may be used to indicate specific nodes. Locators may indicate path information, match conditions, and/or equality/inequality conditions applicable to one or more attributes of nodes of the copy.

The transformation document 210 may specify nodes to transform in a variety of ways. For example, referring to the exemplary source XML document indicated above, a transformation to the <add> node of the <appSettings> node may be indicated by:

```
<appSettings>
    <add key="logLocation" value="E:\contoso\User\Log"
    xdt:Transform="Replace" />
</appSettings>
```

The above data indicates that the <add> node that is embedded in an <appSettings> node is to be replaced with the <add> node indicated above. Children of the <add> node, if any (which there are not in this example), are also to be replaced with the <add> node indicated above.

Because there is only one node in the source XML document that satisfies the criteria indicated above, the above transformation information is sufficient to identify the desired node. Specifying the following:

```
<add key="logLocation" value=" E:\contoso\User\Log"
xdt:Transform="Replace" />
``` would, however, match both the <add> node embedded in the <appSettings> node and the <add> node embedded in the <connectionStrings> node. In one embodiment, when more than one node matches location criteria, the first node in the source XML document is transformed. In another embodiment, when more than one node matches location criteria, each node that matches the criteria is changed according to the transform. In some embodiments, the transform may specify additional information that indicates whether one or more nodes that match the location criteria are to be transformed.

In one embodiment, when no nodes are matched by particular criteria, any transform included in the criteria may be ignored. In another embodiment, an error or warning may be displayed that indicates that the transform will not be applied to any particular node because no nodes match the criteria.

Some other exemplary transforms include Remove, RemoveAll, Insert, SetAttributes, RemoveAttributes, InsertAfter (XPath), InsertBefore (XPath), and XSLT (filePath). These transforms are described in more detail below.

The Remove transform removes the first matching node along with all of its children in creating the transformed document. For example, the following syntax may be used to remove the <customErrors> node and all of its children (e.g., the two <error> nodes):

```
<customErrors   xdt:Transform="Remove"></customErrors>
```

The RemoveAll transform removes all matching nodes under a parent node. For example, the following syntax may be used to remove the <add> node under the <appSettings> node:

```
<appSettings>
    <add xdt:Transform="RemoveAll"/>
</appSettings>
```

As another example, the following syntax may be used to remove both the <error> nodes under the <customErrors> node:

```
<customErrors mode="On"
    defaultRedirect="GenericErrorPage.htm">
        <error xdt:Transform="RemoveAll"/>
</customErrors>
```

The Insert transform inserts the node defined in the transformation document 210 as the last sibling of other siblings, if any, of the node. For example, the following syntax may be used to insert another node under the <appSettings> node:

```
<appSettings>
    <add key="binLocation" value = "E:\contoso\User\bin
        xdt:Transform="Insert"/>
</appSettings>
```

The SetAttributes transform takes the value of the specified attributes from the transformation document 210 and sets the attributes of the matching node in the transformed XML document 220. The SetAttributes transform may receive one attribute or a comma-separated list of attributes that need to be set. For example, the following syntax may be used to set the value attribute of the <add> node of the <appSettings> node:

```
<appSettings>
    <add key="logLocation" value=" E:\contoso\User\Log"
        xdt:Transform="SetAttributes(value)" />
</appSettings>
```

The RemoveAttributes transform removes the specified attributes from the transformed XML document 220. The RemoveAttributes transform may receive one attribute or a comma-separated list of attributes that need to be removed. For example, the following syntax may be used to remove the value attribute of the <add> node of the <appSettings> node:

```
<appSettings>
    <add xdt:Transform="RemoveAttributes(value)" />
</appSettings>
```

The InsertAfter (XPath) transform inserts a node defined by the transformation document 210 after the node specified by XPath. XPath is an XML Path Language. For example, the following syntax may be used to add a node right after the first <allow> node:

```
<authorization>
    <deny users="Vishal"<xdt:Transform="InsertAfter(
        /configuration/system.web/authorization/
        allow[@roles='Admins']") />
</authorization>
```

The InsertBefore (XPath) transform inserts a node defined by the transformation document 210 before the node specified by XPath. For example, the following syntax may be used to add a node right before the first <allow> node:

```
<authorization>
    <deny users="Vishal"<xdt:Transform="InsertBefore(
        /configuration/system.web/authorization/
        allow[@roles='Admins']") />
</authorization>
```

The XSLT (filePath) transform takes an element defined in the source XML document 205 and applies the XSLT transform specified in a file indicated by the transformation document 210 to replace the matching node in the transformed XML document 220. For example, the following syntax may be used to apply an XSLT indicated by the file V:\MyProject\appSettings.xslt to the <appSettings> node:

```
<appSettings xdt:Transform="XSLT(V:\MyProject\
    appSettings.xslt)">
</appSettings>
```

As can be seen above, specifying an XML structure similar to that found in the source XML document 205 may be sufficient to identify one or more nodes that are to be transformed in producing the transformed XML document 220. In determining the one or more nodes to transform, the transformer 215 may read the location information from the transformation document 210 and attempt to match it to one or more nodes of the source XML document 205. Locators in the transformation document 210 may also be used to further specify one or more nodes. Some exemplary locators include Match, Condition, XPath, DoesNotMatch, OrMatch, OrDoesNotMatch, GreaterThan, LesserThan, GreaterThanEquals, and LessThanEquals.

The Match locator specifies that a node is identified if the values of all of the attributes specified in the locator of transformation document match the corresponding attribute values in the source XML document. For example, the following syntax may be used to ensure that a replace transform will occur only when the name Northwind appropriately matches the source XML document:

```
<connectionStrings>
    <add name="Northwind"
        connectionString="replacement connectionString goes here"
        providerName="System.Data.SqlClient"
        xdt:Transform="Replace"
        xdt:Locator="Match(name)" />
</connectionStrings>
```

In the example above, with the exemplary source XML document previously given, there would not be a match as the name of the database in the exemplary source XML document is contosoDB, not Northwind as indicated by the locator above. In this case, the transform may be ignored, a warning or error may be displayed, or other actions may occur.

Multiple attributes may be indicated, if desired, by a comma-separated list in the locator.

The Condition locator specifies that a node is identified if the condition specified by the locator is true. For example, the following syntax may be used to cause a transform to occur when a name is Northwind or a provider name is System.Data.SqlClient:

```
<connectionStrings>
    <add name="Northwind"
        connectionString="connectionString goes here"
        providerName="System.Data.SqlClient"
        xdt:Transform="Replace"
        xdt:Locator="Condition(@name='Northwind or
        @providerName='System.Data.SqlClient')" />
</connectionStrings>
```

In the example above, the locator causes a match of the <connectionStrings> node of the exemplary source XML document previously given. Even though the name attribute of the <connectionStrings> node is contosoDB, the providerName is System.Data.SqlClient so this matches the second condition of the Locator. Because the conditions specified in the locator are joined by an "or" satisfying either condition is sufficient to satisfy the conditions.

The Condition locator creates an XPath predicate that is appended to the current node's XPath. In the above example, the XPath of the current element is /configurations/connectionStrings/add. Using the Locator, this XPath gets expanded to /configurations/connectionStrings/add[@name='Northwind or @providerName='System.Data.SqlClient'].

Note that other operators may also be specified in a condition. For example, and, nor, xor, not, other operators and the like may be used with a Condition locator. Furthermore, other syntax (e.g., parenthesis) may be used to indicate an order in which to apply the operators.

The XPath locator allows a node to be specified via an XPath expression. For example, the following syntax may be used to cause a transform to occur on all system.web nodes that are children of any location nodes:

```
<system.web xdt:Transform="RemoveAll"
    xdt:Locator="XPath(//location/system.web)">
    ...
</system.web>
```

The above example causes all system.web nodes under any location node to be removed.

The DoesNotMatch locator may be used to ensure that a node is matched only if the values of all of the attributes specified in the "locator" of transform XML do not match corresponding attribute values in the source XML.

The OrMatch locator may be used to ensure that a node is matched if the value of any of the attribute specified in the "locator" of transform XML matches the corresponding attribute value in the source XML.

The OrDoesNotMatch locator may be used to ensure that a node is matched if the value of any of the attributes specified in the "locator" of transform XML does not match the corresponding attribute value in the source XML.

The GreaterThan locator may be used to ensure that a node is matched only if the values of all of the attributes specified in the "locator" of transform XML are greater than their corresponding attribute values in the source XML.

The LesserThan locator may be used to ensure that a node is matched only if the values of all of the attributes specified in the "locator" of transform XML are less than their corresponding attribute values in the source XML.

The GreaterThanEquals locator may be used to ensure that a node is matched only if the values of all of the attributes specified in the "locator" of transform XML are greater than or equal to their corresponding attribute values in the source XML.

The LesserThanEquals locator may be used to ensure that a node is matched only if the values of all of the attributes specified in the "locator" of transform XML are less than or equal to their corresponding attribute values in the source XML.

Based on the teachings herein, those skilled in the art will recognize syntax appropriate for the DoesNotMatch, OrMatch, OrDoesNotMatch, GreaterThan, LesserThan, GreaterThanEquals, and LesserThanEquals locators. Furthermore, while a set of locators and transforms has been described above, there is no intention to limit locators or transforms solely to those indicated above. Indeed, based on the teachings herein, those skilled in the art may recognize other locators and transforms that may be used without departing from the spirit or scope of aspects of the subject matter described herein.

Furthermore, a mechanism may be provided that allows a developer, system administrator, or the like (hereinafter "developer") to extend the locators and/or transforms supported by the transformer 215. In particular, the developer may define custom code and associate the custom code with a new locator or transform. If the new locator or transform is found in the transformation document 210, the custom code may be called and passed a handle to the node to transform. The custom code has an option to transform the node and/or any other nodes included in the source document. The custom code may also perform any other actions that can be performed by software such as sending an e-mail, performing computations, interacting with a user interface, saving files, reading files, or any other actions that can be represented by computer code.

With the syntax above, there are many ways in which to create a transformation document that indicates changes to make to the exemplary source XML document mentioned previously to create the exemplary transformed document. One exemplary transformation document is as follows:

```
<?xml version="1.0"?>
<configuration>
    <appSettings>
        <add key="logLocation" value="E:\contoso\User\Log"
            xdt:Transform="SetAttributes(value)" />
    </appSettings>
    <connectionStrings>
        <add name="contosoDB" connectionString="Data
Source=ProdServer;database=contosoDB;Integrated
Security=True;"
            providerName="System.Data.SqlClient"
            xdt:Transform="Replace"/>
    </connectionStrings>
    <system.web>
        <compilation debug="false"
            xdt:Transform="SetAttributes(debug)">
        </compilation>
        <authentication mode="Windows" />
        <authorization>
            <allow roles="Admins" />
            <allow roles="Developers" />
            <deny users="Vishal" xdt:Transform="InsertAfter(
                /configuration/system.web/authorization/
```

```
            allow[@roles='Admins']") />
        </authorization>
        <customErrors mode="Off"
            xdt:Transform="SetAttributes(mode)">
        </customErrors>
    </system.web>
</configuration>
```

Figure 3:
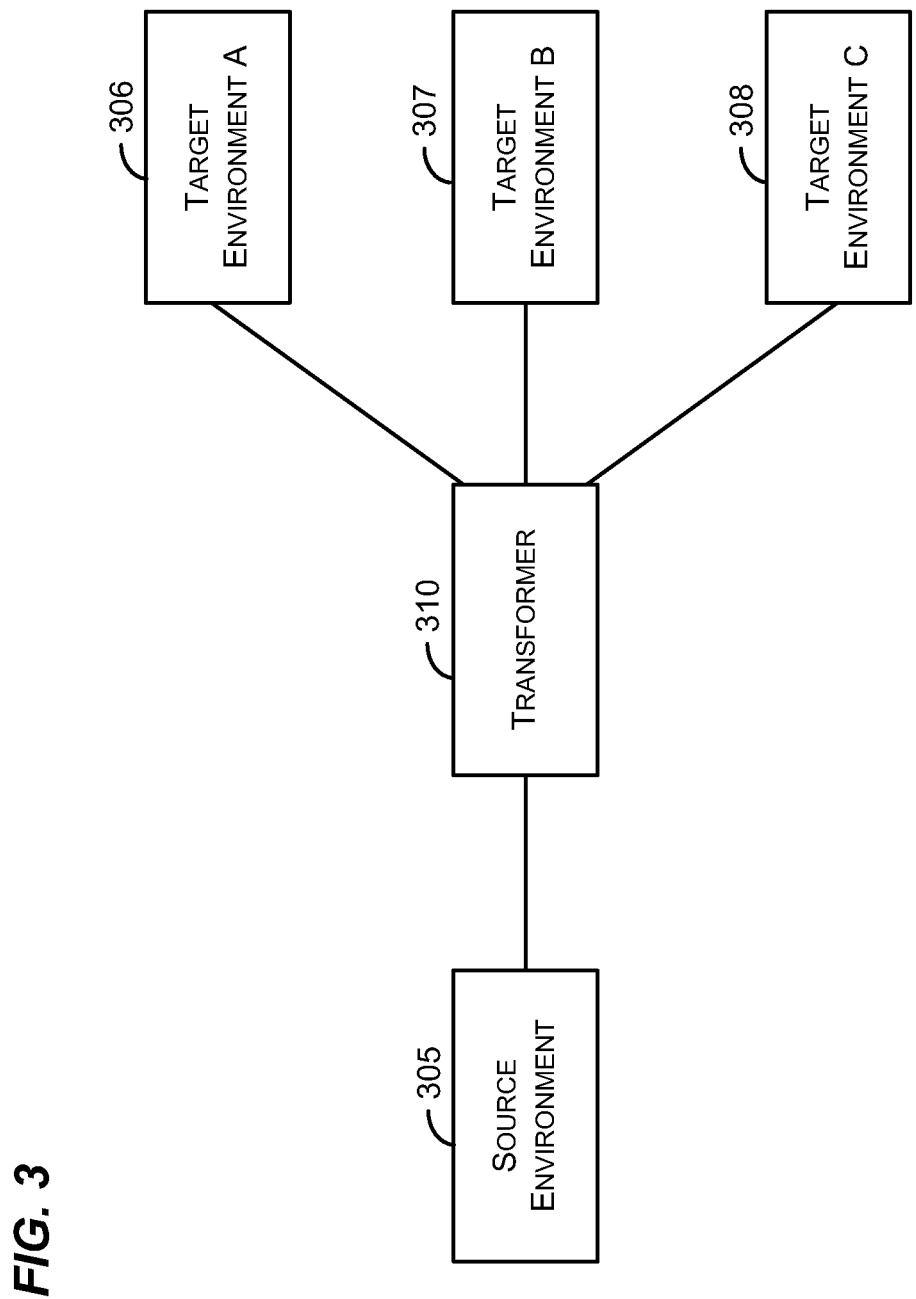
FIG. 3 is a block diagram that representing another environment in which aspects of the subject matter described herein may be implemented.

FIG. 3 is a block diagram that representing another environment in which aspects of the subject matter described herein may be implemented. The environment may include a source environment 305, one or more target environments 306-308, and a transformer 310. The environments 305-308 may include, for example, a development environment, a testing environment, a quality assurance environment, a staging environment, a production environment, or some other environment.

The target environments 306-308 may include virtual or physical targets. The term virtual target includes an environment or a portion thereof that is simulated or emulated by a computer. For example, when a machine is simulated or emulated at the hardware level, the resulting entity is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth. Although a virtual machine is one suitable virtual target, other exemplary virtual targets include virtual environments in which operating systems or portions thereof may be emulated or simulated.

A physical target may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

The transformer 310 is a component corresponding to the transformer 215 of FIG. 2 and may be implemented similarly. The transformer 310 may transform configuration files used by an application in the source environment 305 to be suitable for when the application executes in one of the target environments 306-308. The term "suitable" refers to the configuration file includes those settings that are appropriate for the target environment. As just some examples, settings such as connection strings, log file names, whether debug is enabled, users that are authorized to access content or services, whether custom errors are generated, and other settings may need to be changed to make a configuration file suitable for use with an application in a target environment.

In certain environments, an application may use a configuration file that is encoded in XML. An application, as used herein, may include or be associated with one or more executable files and any data, services, or other components used or referenced by the executable files.

Although the environments described above includes various numbers of the entities, it will be recognized that more, fewer, or a different combination of these entities and others may be employed without departing from the spirit or scope of aspects of the subject matter described herein.

Figure 4:
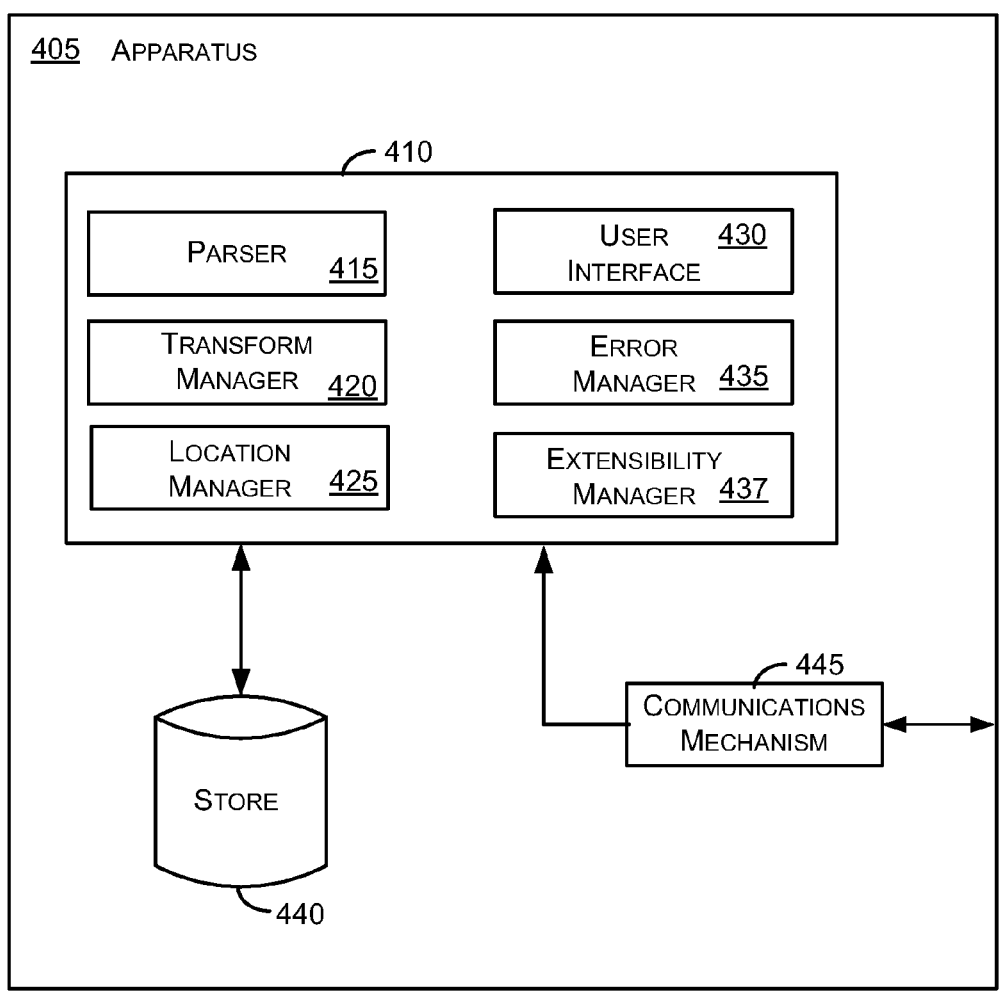
FIG. 4 is a block diagram that represents an apparatus configured in accordance with aspects of the subject matter described herein.

FIG. 4 is a block diagram that represents an apparatus configured in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

Turning to FIG. 4, the apparatus 405 may include transformation components 410, a store 440, a communications mechanism 445, and other components (not shown). The apparatus 405 may be implemented on or as a computer (e.g., as the computer 110 of FIG. 1).

The transformation components may include a parser 415, a transform manager 420, a location manager 425, a user interface 430, an error manager 435, an extensibility manager 437, and other components (not shown).

The communications mechanism 445 allows the apparatus 405 to communicate with other entities. For example, referring to FIG. 3, the communications mechanism 445 may allow the apparatus to communicate with entities in the source and target environments 305-308. The communications mechanism 445 may be a network interface or adapter 170, modem 172, or any other mechanism for establishing communications as described in conjunction with FIG. 1.

The store 440 is any storage media capable of storing data. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 440 may comprise a file system, database, volatile memory such as RAM, other storage, some combination of the above, and the like and may be distributed across multiple devices. The store 440 may be external, internal, or include components that are both internal and external to the apparatus 405.

The parser 415 may be operable to read a copy of a source document and to read transformation data from a transformation document. The source document may include configuration data associated with an application. The configuration data is meant for use by the application in conjunction with the application executing in a first environment.

In reading the copy and the transformation document, the parser may identify nodes. As mentioned previously, these nodes may be arranged in a hierarchical manner with parent, children, and siblings nodes.

The location manager 425 may be operable to determine a location at which to make a modification to the copy of the source document. The location manager 420 may use the transformation data read by the parser 515 to determine the location.

In one embodiment, the location manager 425 may determine a location at which to make a modification by matching a transform node (e.g., a node included in the transformation document) with a corresponding node included in the source document. The transform node is any node in the transformation document that includes an indication of a transform such as one of the transforms previously mentioned.

In another embodiment, the location manager 425 may determine a location at which to make a modification to the copy by matching a path indicated in the transformation data.

In another embodiment, the location manager is operable to determine a location at which at which to make a modification to the copy by matching a condition indicated in the transformation data.

The transform manager 420 is operable to determine a transform corresponding to the modification. For example, the transform manager 420 may determine any one of the transforms indicated previously. The transform manager is further operable to apply the transform to the copy at the location determined by the location manager 425 to create transformed data suitable for the application for when the application executes in a second environment.

The user interface 430 may be operable to receive settings, instructions, file locations, and the like from a user and to provide feedback as to the activity of the transformation components 410.

The error manager 435 may be operable to identify errors, if any, in the transformation document and to display, via the user interface 430, text associated with the errors. For example, the error manager 435 may display a line of the transformation document that is associated with the error.

The extensibility manager 437 is operable to call custom code in conjunction with a transform that is not natively implemented by the transform manager. The term natively refers to the transform being implemented by the transform manager 420 without calling code external to the transform manager 420.

Figure 5:
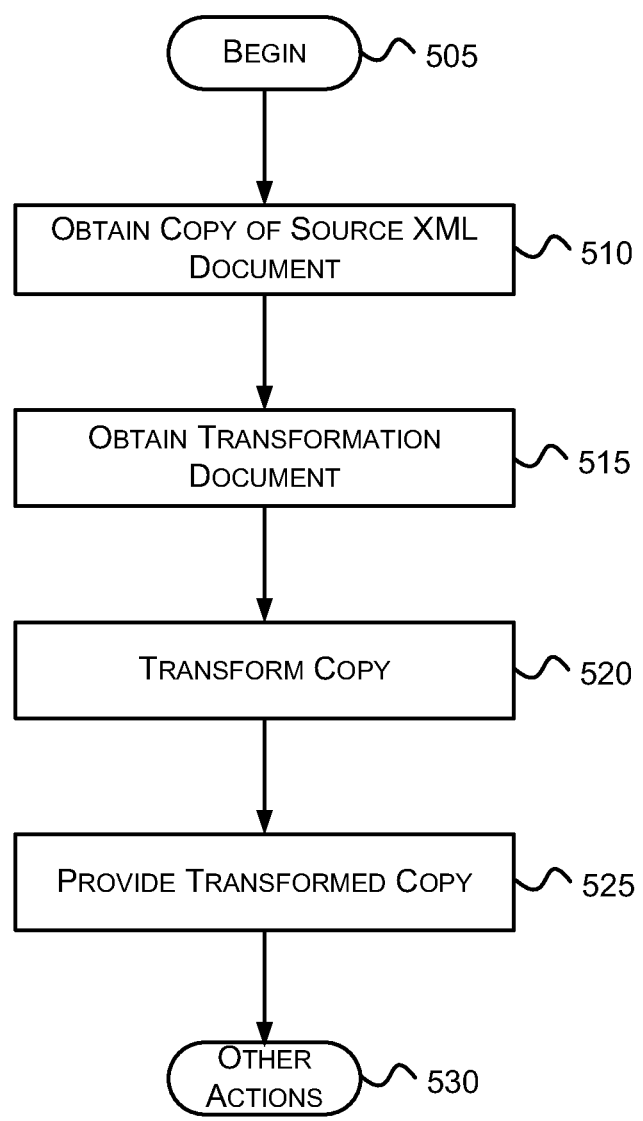
FIG. 5 is a flow diagram that represents exemplary actions that may occur to transform an XML document in accordance with aspects of the subject matter described herein.

FIGS. 5-6 are flow diagrams that generally represent actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that represents exemplary actions that may occur to transform an XML document in accordance with aspects of the subject matter described herein. Turning to FIG. 5, at block 505, the actions begin. For example, referring to FIG. 4, a user may indicate via the user interface 430 that an XML document is to be transformed.

At block 510, a copy of a source XML document is obtained. Note that obtaining a "copy" of a source XML document does not necessarily (but may) mean that there are multiple copies of the source XML document and that one of the copies is selected. For example, referring to FIG. 4, obtaining a copy of a source XML document may comprise reading data corresponding to the source XML document from the store 440 and placing the data in volatile memory such as RAM.

At block 515, the transformation document is obtained. As mentioned previously, the transformation document may indicate modifications to make to the copy to transform the copy into a target XML document. These modifications may be encoded in transforms where each transform indicates an action to take with respect to a node of the copy. As mentioned previously, a transform that occurs later in a transformation document may overwrite the changes made by a transform that occurs earlier in the transformation document.

The transformation document may also include location information that indicates nodes in the copy upon which the modifications are to operate. The location information may encode the location information explicitly via locators and/or in nodes of the transformation document where at least some of the nodes of the transformation document correspond to at least some nodes of the copy.

Note that if no new nodes are being added to the copy, the transform document may differ from the copy only by transform statements and settings included in the transformation document that are not included in the copy. This may be useful, for example, if a developer wants to change settings in various nodes, but does not want to add new nodes. In some cases, it may be easier for the developer to copy the source document to create a transformation document, add Setting transforms to and modify settings, as appropriate, in the transformation document. For example, to change the source document:

```
<?xml version="1.0"?>
<configuration>
    <appSettings>
        <add key="logLocation" value="V:\Logs" />
    </appSettings>
    <connectionStrings>
</configuration>
``` a developer could copy the source document to create a transformation document and make the changes bolded below:

```
<?xml version="1.0"?>
<configuration>
    <appSettings>
        <add key="logLocation" value="E:\contoso\User\Log"
             xdt:Transform="SetAttributes(value)" />
    </appSettings>
    <connectionStrings>
</configuration>
```

Note that in the example above the transformation document differs from the source document only by transform statements (e.g., xdt:Transform="SetAttributes (value)") and settings changes (e.g., E:\contoso\User\Log).

Instead of repeating the entire source document and making changes, a developer may include only those nodes that need to be modified in a transformation document. The developer may include other nodes that do not need to be modified as well if desired.

At block 520, the copy is transformed according to the transformation document to create a target XML document.

For example, referring to FIG. 2, a copy of the source XML document 205 is transformed according to the transformation document 210 to create the transformed XML document 220.

At block 525, the target XML document is provided. For example, referring to FIG. 4, the target XML document may be stored in the store 440 or provided via the communications mechanism 445 to another entity.

At block 530, other actions, if any, are performed.

FIG. 6 is a flow diagram that represents exemplary actions that may occur to transform configuration data of an application to make the configuration data suitable for use by the application in another environment in accordance with aspects of the subject matter described herein. Turning to FIG. 6 at block 605, the actions begin. For example, referring to FIG. 4, a user may indicate via the user interface 430 that configuration data for an application are transformed for use by the application in another environment.

At block 610, the configuration data is obtained for an application that is operable to execute in a first environment. For example, referring to FIG. 3, the transformer 310 may obtain configuration data for an application that is operable to execute in the source environment 305. Referring to FIG. 4, this configuration data may be obtained from the store 440 or from another entity via the communications mechanism 445. The configuration data may be encoded in an XML document or other document.

As used herein, the terms first and second environment are not intended to imply that environments may have a natural or intrinsic ordering. Rather, these terms are used generically to mean any two different environments.

At block 615, transformation data is obtained. For example, referring to FIG. 4, the parser 415 may obtain transformation data from the store 440 or from another entity via the communications mechanism 445. The transformation data indicates modifications to make to the first configuration data to create second configuration data suitable for when the application is executing in a second environment. The transformation data may be encoded in a declarative language having syntax that has been described previously.

The transformation data may include transforms that indicate changes to make to the configuration data to transform the configuration data. The transformation data may also include location information that indicates locations within the first configuration data at which the modifications are to be made.

At block 620, the configuration data is transformed. For example, referring to FIG. 4, the transformation components 410 may transform the configuration data to create configuration data suitable for the application for when the application is executing in a second environment.

In some cases, it may not be known at the time of transformation what settings are appropriate for the configuration data in a target environment. In these cases, markers may be placed in the configuration data to indicate that data in the second configuration data needs to be filled to prepare the environment for the application. Either the application or another component may spot these markers, request additional input, and change the configuration data for use in the second environment.

At block 625, other actions, if any, may be performed.

Although some of the disclosure herein has focused on XML files, the teachings herein may also be applied to other files. For example, the teachings herein may be applied to hierarchical data structures represented in virtually any language without departing from the spirit or scope of aspects of the subject matter described herein.

As can be seen from the foregoing detailed description, aspects have been described related to transforming documents. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   obtaining a copy of a source XML (Extensible Markup Language) document, the source XML document including configuration data for use by an application in conjunction with the application executing in an environment;
   obtaining a transformation document that includes declarative statements that indicate modifications to make to the copy to transform the copy into a target XML document, the transformation document also including location information that indicates nodes in the copy upon which the modifications are to operate;
   transforming, within an integrated development environment, the copy of the source XML document according to the transformation document to create the target XML document, a first declarative statement of the transformation document indicating a file and an element of the copy, the file including additional declarative statements that indicate one or more modifications to make to the element of the copy, transforming the copy including applying the one or more modification to the element of the copy; and
   providing the target XML document; and
   wherein the copy and the transformation document have an identical schema that expresses constraints on structure and content of the copy and transformation document, the constraints additional to constraints imposed by XML.

2. The method of claim 1, wherein obtaining a transformation document that includes declarative statements comprises obtaining a transformation document that differs from the copy only by transform statements and setting changes included in the transformation document that are not included in the copy.

3. The method of claim 1, wherein obtaining a transformation document that includes declarative statements comprises obtaining a transformation document that includes transforms, each transform indicating an action to take with respect to a node of the copy.

4. The method of claim 3, wherein obtaining a transformation document that includes transforms comprises obtaining transforms that indicate one or more of removing a node along with its children, if any, removing all nodes under a parent node, inserting the node under the parent node, setting one or more attributes of the node, and removing one or more attributes of the node.

5. The method of claim 1, wherein obtaining a transformation document that includes location information comprises obtaining a transformation document that encodes the location information in nodes of the transformation document, at least some of the nodes of the transformation document corresponding to at least some nodes of the copy.

6. The method of claim 1, wherein obtaining a transformation document that includes location information comprises obtaining a transformation document that includes locators, the locators indicating match conditions and/or equality/inequality conditions applicable to one or more attributes of nodes of the copy.

7. The method of claim 1 wherein the transformation document includes at least two transforms to a single node in the copy and wherein transforming transforms the single node in the copy by applying the at least two transforms to the copy in an order in which the at least two transforms appears in the transformation document.

8. A computing apparatus, comprising:
   one or more processors;
   one or more memory devices that store computer-executable instructions for execution by the one or more processors, the computer-executable instructions configured to perform actions including:
   reading a copy of a source document and transformation data from a transformation document, the source document including first configuration data for use by an application in conjunction with the application executing in a first environment;
   determining a location at which to make a modification to the copy based on the transformation data; and
   determining a transform corresponding to the modification;
   applying the transform to the copy at the location to create transformed data suitable for the application for when the application executes in a second environment; and
   wherein the copy and the transformation document have an identical schema that expresses constraints on structure and content of the copy and transformation document, the constraints additional to constraints imposed by one or more languages in which the copy and the transformation document are represented.

9. The apparatus of claim 8, wherein said reading comprises identifying nodes in the copy and the transformation document, the copy and the transformation document having nodes arranged in a hierarchical manner, each node including a set of related data.

10. The apparatus of claim 8, wherein said determining a location comprises determining a location at which to make a modification to the copy by matching a transform node included in the transformation document with a corresponding node included in the source document, the transform node including an indication of the transform.

11. The apparatus of claim 8, wherein said determining a location comprises determining a location at which to make a modification to the copy by matching a path indicated in the transformation data.

12. The apparatus of claim 8, wherein said determining a location comprises determining a location at which at which to make a modification to the copy by matching a condition indicated in the transformation data.

13. The apparatus of claim 8, further comprising identifying errors, if any, in the transformation document and displaying, via a user interface, text associated with the errors, the transformation document including the text.

14. The apparatus of claim 8, further comprising calling custom code in conjunction with a transform that is not natively implemented by the transform manager.

15. A computer storage medium having computer-executable instructions, which when executed perform actions, comprising:
   obtaining first configuration data for an application that is operable to execute in a first environment;
   obtaining transformation data that indicates modifications to make to the first configuration data to create second configuration data suitable for when the application is executing in a second environment, the transformation data encoded in a declarative language;
   transforming the first configuration data according to the modifications indicated in the transformation data to create the second configuration data; and
   wherein the first configuration data and the transformation data have an identical schema that expresses constraints on structure and content of the first configuration data and the transformation data, the constraints additional to constraints imposed by one or more languages in which the first configuration data and the transformation data are represented.

16. The computer storage medium of claim 15, wherein obtaining first configuration data for an application comprises obtaining the configuration data from an XML (Extensible Markup Language) document.

17. The computer storage medium of claim 15, wherein obtaining transformation data that indicates modifications comprises obtaining transformation data that includes transforms, the transforms indicating changes to make to the first configuration data to transform the first configuration data into the second configuration data.

18. The computer storage medium of claim 15, wherein obtaining transformation data that indicates modifications comprises obtaining transformation data that includes location information, the location information indicating locations within the first configuration data at which the modifications are to be made.

19. The computer storage medium of claim 15, wherein transforming the first configuration data according to the modifications indicated in the transformation data to create the second configuration data comprises placing markers in the second configuration data to indicate that data in the second configuration data needs to be filled in to prepare the second environment for the application.

20. The computer storage medium of claim 15, wherein a first declarative statement of the transformation data indicates a file and an element of the first configuration data, the file including additional declarative statements that indicate one or more modifications to make to the element of the first configuration data, transforming the first configuration data including applying the one or more modification to the element of the first configuration data.

* * * * *